2,454,444

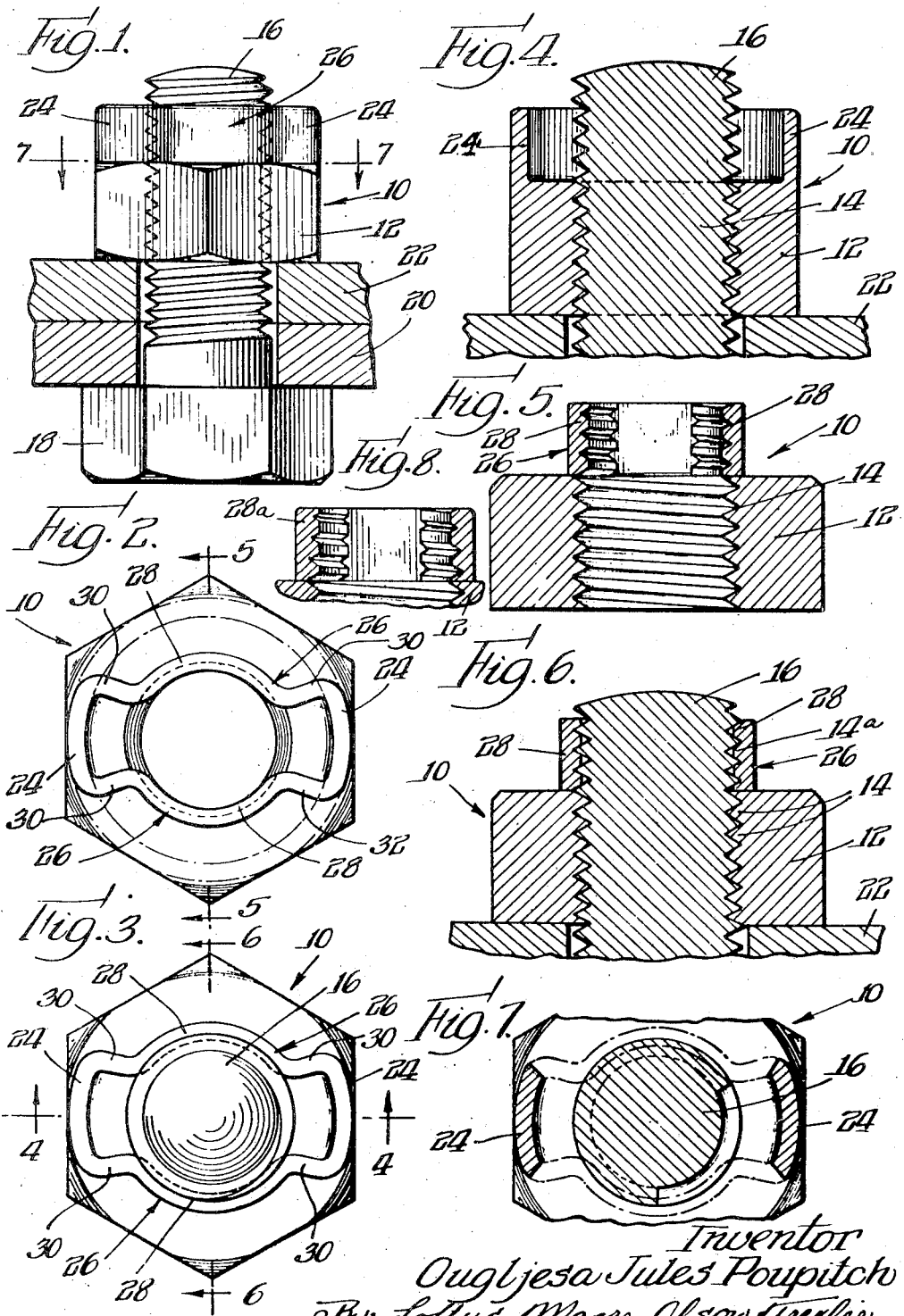
Nov. 23, 1948. O. J. POUPITCH 2,454,444
LOCK NUT AND METHOD OF MAKING SAME
Filed April 24, 1944
Inventor
Ougljesa Jules Poupitch Patented Nov. 23, 1948

UNITED STATES PATENT OFFICE 2,454,444

LOCK NUT AND METHOD OF MAKING SAME

Ougljesa Jules Poupitch, Chicago, Ill., assignor to Illinois Tool Works, Chicago, Ill., a corporation of Illinois Application April 24, 1944, Serial No. 532,385

4 Claims. (Cl. 10—86)

This invention relates generally to lock nuts and more particularly to lock nuts of the type provided with integral thread locking means at one extremity of the nut body.

The present invention is concerned with the problem of producing lock nuts of improved practical construction which may be made by the practice of simple and economical methods of manufacture. To this end, the invention contemplates the use of conventional internally threaded rigid nut bodies, said bodies having in integral association therewith resilient thread locking means for lockingly engaging a complementary screw thread.

More specifically, the present invention contemplates thread locking means of the type set forth above which may be formed by shearing sections from an axially projecting portion of the body.

It is a further object of the present invention to provide, in association with the aforesaid nut body, novel resilient thread engaging sections extending between lugs extending axially from one extremity of the nut body.

Still another important object of the present invention is to provide novel methods whereby lock nuts of the type referred to above may be produced, said methods contemplating the shearing and forming of an axially projecting section such as an annular section or rim of the body.

The foregoing and other objects and advantages will be more apparent from the description which follows when this description is considered in connection with the various figures of the accompanying drawing, wherein Figure 1 is an elevational view disclosing a bolt having in operative association therewith a lock nut of the type contemplated by the present invention, the working pieces through which the bolt extends being shown in section;

Figure 2 is a plan view of the lock nut disclosed in Figure 1 prior to the application thereof to the bolt of Figure 1;

Figure 3 is a plan view, similar to Figure 2, showing the lock nut in operative association with the bolt;

Figure 4 is a central transverse sectional view of the lock nut taken substantially along the line 4—4 of Figure 3;

Figure 5 is a central transverse sectional view taken along the line 5—5 of Figure 2;

Figure 6 is a similar transverse sectional view taken substantially along the line 6—6 of Figure 3;

Figure 7 is a horizontal sectional view taken substantially along the line 7—7 of Figure 1; and Figure 8 discloses a slightly modified arrangement of the segmental sections wherein the thread convolutions taper from a maximum external diameter at the inner extremity to a lesser maximum diameter at the outer extremity.

Referring now to the drawing more in detail wherein like numerals have been employed to designate similar parts throughout the various figures, it will be seen that one embodiment of the present invention is illustrated as a lock nut designated generally by the numeral 10. The lock nut 10 includes a substantial rigid body portion 12 of conventional design which is provided with internal thread convolutions 14 to accommodate a complementary screw element 16. In the drawing this screw element 16 comprises a bolt having a conventional head 18, Figure 1, and in this figure the head of the bolt clampingly engages work pieces 20—22 on one side, and the nut body 12 clampingly engages the said work pieces on the opposite side.

Particular attention is directed to the outer extremity of the nut body 12 which is equipped with a pair of oppositely disposed axially extending lugs 24. Extending from the side of one lug to the corresponding side of the oppositely disposed lug is a resilient locking strip or section designated generally by the numeral 26. These locking sections or strips 26 include a central segmental locking portion 28 and connecting sections 30 which form the connection between lugs 24 and the segmental portions 28.

The aforesaid resilient locking sections, each of which includes the central segmental section 28 and complementary connecting sections 30, are preferably formed by shearing a portion of annular stock axially extending from and formed integral with the nut body 12. The dot and dash lines shown in Figure 2 illustrate the position of the aforesaid axial projection or rim before the resilient locking sections 26 are sheared and shifted transversely with respect to the axis of the nut body into the position disclosed in Figure 2. The unsheared portion of the annular projection or rim provides the lugs 24. In forming the nut structures disclosed herein the tapping of the threads in the nut body does not take place until the locking sections 26 have been sheared and shifted inwardly. Initially the sheared segmental portions 28 are shifted until the inner surface thereof occupies the position shown in Figures 3 and 6. Both the nut body and segmental portions are then tapped so that the thread convolutions 14 in the nut body are in helical alignment or phase relation with thread convolutions 14a in the segmental sections 28. Subsequently these segmental portions 28 are deflected inwardly to the position shown in Figures 2 and 5. This final shifting of the segmental sections positions the screw thread engaging surfaces or convolutions 14a inwardly with respect to the maximum diameter of the internal thread or convolutions 14 of the body 12. Thus, in order for the thread surfaces in the segmental sections 28 to track within the complementary thread convolutions of the screw 16, the locking sections 28 must be sprung outwardly. It is this resilient shifting or springing of the locking sections which provides a firm frictional grip between the thread engaging surfaces of the segmental sections 28 and the complementary thread surfaces of the screw member 16.

In Figure 8 the segmental sections are indicated by the numeral 28a. These segmental sections 28a are slightly modified in that the internal thread thereof has a greater diameter in the vicinity of the nut body than at the outer side thereof. It will be noted that the maximum diameter of the thread convolutions in the segmental sections 28a in the vicinity of the nut body approximates the maximum diameter of the thread convolutions in the nut body. This arrangement of the tapering threads serves to facilitate the entrance of the screw member as it moves from the nut body toward the segmental sections. This tapering arrangement of the threads may be accomplished by employing a tap having a tapering extremity. The thread convolutions in the segmental sections 28a are thus formed by the tapering extremity of the tap, whereas the thread convolutions in the nut body are thus formed by the portion of the tap which is of uniform diameter.

From the foregoing it will be apparent that when the lock nut 10 is tightened in position, as illustrated in Figure 1, the segmental portions 28 provide thread engaging or locking surfaces of substantial circumferential extent. Also, each extremity of the thread surfaces in the segmental sections 28 merges with the portion joining the connecting section 30 and the segmental section, and hence no scraping or marring of the thread in the screw member occurs as the nut and screw member are relatively rotated. The resilient portions which join the connecting sections at one side to the lugs and at the opposite sides to the segmental sections provide the required degree of spring resistance to effect firm clamping engagement between the thread surfaces 14a and the complementary thread surfaces in the screw member. The shearing of the resilient strips 26 from the main body of the nut renders them freely shiftable and at the same time provides a bearing on the under side of the strips so as to counteract any tendency for axial distortion thereof.

While certain specific structural details of design have been disclosed herein for purposes of description, it will be clear that other changes and modifications may be made without departing from the spirit and scope of the appended claims.

The invention is hereby claimed as follows:

1. A lock nut including a rigid internally threaded body, circumferentially spaced lugs integral with and extending axially from the body at one extremity thereof, segmental locking sections superimposing the aforesaid extremity of the body and having arcuate thread engaging surfaces normally positioned inwardly with respect to the maximum diameter of the internal thread in the body, and connecting elements extending between said lugs and locking sections, said locking sections and connecting elements being sheared from an axially projecting portion of the body and shifted transversely with respect to the axis of said body, said lugs being spaced radially from the internally threaded portion of the nut body.

2. A lock nut including a rigid internally threaded body, circumferentially spaced lugs integral with and extending axially from the body at one extremity thereof, said lugs being spaced radially outward from the internally threaded aperture, and resilient circumferentially spaced locking sections formed integral with and extending between said lugs, said locking sections being sheared from an axially projecting annular rim of the body and shifted transversely with respect to the axis of said body to present arcuate thread engaging surfaces of limited circumferential extent normally positioned inwardly with respect to the maximum diameter of the internal thread in the body.

3. The method of producing lock nuts which consists in forming a continuous annular extension at one end of a rigid nut body and spaced from the nut aperture, shearing a plurality of circumferentially spaced portions of said annular extension by applying force to said portions tranversely with respect to the axis of the nut body, and shifting said sheared portions inwardly so as to provide arcuate thread locking sections of limited circumferential extent connected by unsheared sections of said annular extension.

4. The method of producing lock nuts which consists in providing a centrally apertured unthreaded rigid nut body with an annular extension, shearing oppositely disposed portions of said extension by applying force transversely with respect to the nut axis, forming said sheared portions into arcuate locking sections, tapping said body and arcuate portions to provide an internal thread, and then shifting said arcuate portions inwardly so as to position the thread thereof inwardly with respect to the maximum diameter of the internal thread in the body.

OUGLJESA JULES POUPITCH.

REFERENCES CITED

The following references are of record in the file of this patent:

UNITED STATES PATENTS

| Number | Name | Date |
| --- | --- | --- |
| 2,007,293 | Cayouette | July 9, 1935 |
| 2,279,388 | Cox | Apr. 14, 1942 |